Oct. 27, 1936. G. F. BRECHT ET AL 2,058,850
CUFF LINK
Filed March 27, 1935
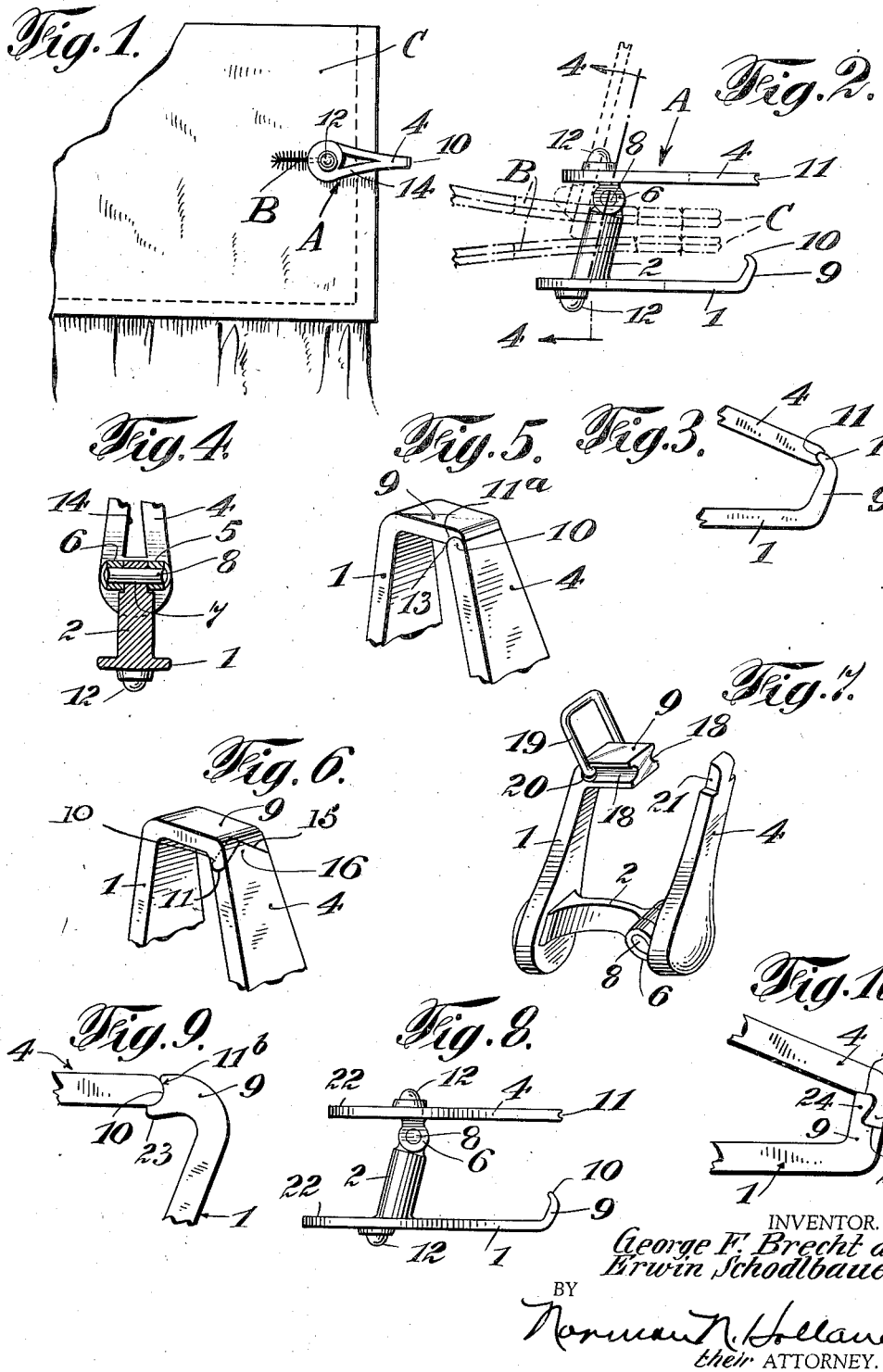
INVENTOR.
George F. Brecht and
Erwin Schodlbauer
BY
Norman N. Holland
their ATTORNEY.

Patented Oct. 27, 1936

2,058,850

UNITED STATES PATENT OFFICE 2,058,850

CUFF LINK

George F. Brecht, Richmond Hill, and Erwin Schodlbauer, New York, N. Y.

Application March 27, 1935, Serial No. 13,206

6 Claims. (Cl. 24—102)

The present invention relates to cuff links and the like, and more particularly to cuff links which hold the cuff securely in position and which are not likely to be lost.

Several types of cuff links are now in use, for example, those without moving parts, others with a pivoted button on one side, and still others with pairs of buttons linked together. Attempts have been made to make cuff links in which buttons pass through the button holes in the cuffs with means extending over the ends of the cuff for engaging and locking with each other to prevent loss of the links. Such devices have been complicated, ineffective, unsightly, difficult to insert and remove, or otherwise objectionable and have, therefore, not been commercially successful. The present invention relates more particularly to this last described type of cuff link and aims to overcome the objections of previous constructions and to provide a cuff link having all of the advantages of the usual type of link and additional advantages, including ease of application and removal, secure engagement of the links with the cuff without danger of the links coming out of the button hole or of being lost. The cuff link may be readily inserted into the button holes with one hand and the locking means may also be operated with one hand, either to fasten or unfasten the links.

An object of the present invention is to provide a cuff link having means for securing it against loss or accidental removal without marring the appearance thereof.

Another object of the invention is to provide a simple and inexpensive cuff link construction which may be fastened against loss or accidental removal.

Another object of the invention is to facilitate application and removal of the class of cuff links described herein.

Another object of the invention is to provide a rigid construction which will withstand the rough usage to which cuff links are subjected.

Another object of the invention is to provide a locking or fastening device which may be readily and inexpensively made and which is simple and easy to operate with one hand in both the fastening and unfastening operations.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a top plan view of the cuff link described herein, shown in operative engagement with a cuff;

Fig. 2 is a side elevational view with the fastening means disengaged and with the upper member shown in dotted lines in its raised position;

Fig. 3 is an enlarged fragmentary detailed view of the ends of the cuff link in locking engagement;

Fig. 4 is a sectional view along the lines 4—4 of Fig. 2, illustrating details of the construction;

Fig. 5 is a perspective view, illustrating another form of locking means;

Fig. 6 is a fragmentary perspective view, illustrating another form of locking means;

Fig. 7 is a perspective view illustrating another form of locking or fastening means;

Fig. 8 is a side elevational view similar to Fig. 2 illustrating a slightly different construction;

Fig. 9 is an enlarged fragmentary side elevational view of another form of locking means, and Fig. 10 is an enlarged fragmentary side elevational view of still another form of locking means.

Referring again to the drawings, and particularly to Fig. 1 thereof, there is shown, in Fig. 1, a cuff link A inserted through holes B in a cuff C. Referring more particularly to Figs. 2, 3 and 4 of the drawing, a preferred embodiment of the cuff link is shown having a lower member 1 with a stud 2 adjacent one end thereof rigidly fixed thereto and, as shown herein, integral therewith. The upper end of the stud 2 is pivotally secured to one end of a second member 4, substantially similar to the member 1. A pivot is preferably formed by a pair of bearings or trunnions 5 and 6, rigidly fixed to or preferably formed integral with one end of the member 4 and the end of the stud 2 likewise has an aperture or bearing 7 therethrough. A pin 8 extends through the bearings 5, 6 and 7 to rigidly and pivotally mount the member 4 on the end of the stud 2, the member 4 being in line with and directly above the member 2. The pivotal connection described is such that the member 4 moves about the upper end of the stud 2 in a single plane. The stud 2 preferably extends upwardly from the member 1 at an acute angle thereto, with the upper end leaning toward the free end of the member 1. The acute angle makes it easier to insert the member 4 through the button holes in the cuff, since a thumb or finger fits more readily against the stud 2 and member 1 of such a construction.

The preferred embodiment of locking means is shown in Figs. 2 and 3 and is preferably formed by bending upwardly the free end of the member 1, as shown at 9, with the extreme end bent inwardly toward the stud 2 and rounded to form a ridge extending transversely of the end, as shown at 10. The free end of the upper or second member 4 has a groove 11 formed in its end extending transversely thereof so that when the ends of the members 1 and 2 are pressed together, the extreme end 10 of the member 1 may snap into the groove 11 in member 2 to hold these parts securely in their closed position.

In the operation of the construction, the ends of the members 1 and 4 are unfastened and the member 4 is moved into the dotted position shown in Fig. 2, in which position the pointed end of the member 4 may be easily inserted through the holes B of a cuff. After being inserted through the holes, the ends of the members 1 and 4 are turned until they project beyond the ends of the cuff, if they are not already in this position. The members 1 and 4 may then be pressed together with the thumb and finger until the ends thereof snap into interlocking engagement. Since the pivotal connection forces the member 4 to move in a single plane with respect to the member 1, the ends 10 and 11 will always be in position to snap into engagement when the two members are pressed together. In addition, the upwardly bent end 9 has sufficient flexibility and resiliency to permit the round part 10 to snap into the groove 11. Since the bent end 9 is integral with the member 1, the opening and closing merely flexes it to a slight extent and does not in any way impair it. This eliminates separate springs which are likely to be weakened with use. While the members 1 and 4 are shown elongated and somewhat pointed, it will be understood that they may be made wider, oval, or in any other shape desired, without impairing the ease of insertion and removal or the operation of the fastening means. Small ornamented stones 12 are shown adjacent the respective ends of the stud 2 to improve the appearance of the construction. Likewise, a recess 14 may be provided in the members 1 and 4 as a further decoration. These or other artistic effects may be included or omitted, as desired.

The construction shown in Fig. 5 is a perspective view illustrating the groove, indicated as 11a, formed on the end of the bent portion 9, with the rounded end or ridge 10 formed on the member 4. It will be noted in this construction also that the lower side of the groove 11a extends inwardly substantially, as shown at 13, to provide a support for the free end of the member 4 to prevent the ridge 10 from being pressed out of the groove 11a. This construction is substantially similar to Fig. 2, except that the groove and ridges 10 and 11 are interchanged.

Referring more particularly to Fig. 6 a construction similar to that described above is shown, with slightly different locking means. As illustrated, the bent end 9 of the member 1 has a V-shaped recess in the inwardly bent end thereof, as shown at 15. The free end of the member 4 is provided with a V-shaped projection 16 adapted to fit into the recess 15. Preferably, the V-shaped recess 15 has a transversely extending rounded portion or rib 10 therein adapted to fit into a transversely extending groove 11 in the V-shaped projection 16. It will be understood, however, that the groove may be formed on either the projection 16 or the recess 15, with the ridge or projection on the other of said parts. It will also be understood that other types of locking means may be utilized.

Fig. 7 is a perspective view with a further form of locking means. The locking means shown is particularly adapted for the more expensive links, although it may be used with other types. In this construction, the upwardly bent end 9 has a pair of grooves 18 on its respective sides with a bail element 19 having its ends secured in recesses or apertures 20. The free end of the member 4 fits against the upper end of the member 9 and preferably has recesses 21 at its corners. In the operation of this construction, the member 4 is pressed against the end of the upwardly bent portion 9 and the bail element 19 swung over the free end of the member 4, in which position the sides of the bail snap into the grooves 18 and securely fasten the ends of the cuff link together.

In Fig. 8 the ends of the members 1 and 4 adjacent to the stud 2 are extended outwardly further, as shown at 22, to permit the opposite ends of the link to be opened by pressures on the extended end 22. It is more convenient to open the members by pressing the extended ends of the members 1 and 4 apart with the thumb and finger but, in some cases, attempts may be made to open them by pressure on the short end of the member 4. The extension 22 is helpful where the link is opened in this manner.

In Fig. 9 there is shown a locking means similar to the one shown in Fig. 5. A groove 11b is formed at the end of the bent portion 9 of member 1 and a rounded portion or ridge 10 is formed on the member 4. Adjacent to the lower edge of the groove an extension or lip 23 is provided adapted to act as a stop for preventing the ridge 10 from being forced past the groove. In this manner, the link members 1 and 4 are securely held in locked relation and cannot move accidentally in either direction.

In Fig. 10 another embodiment is illustrated for accomplishing the above advantages. The bent end 9 of member 1 is provided with a substantially dove-tailed ridge 24 and the member 4 is provided with a similar ridge 25 at its free end adapted to be forced into interlocking engagement with the ridge 24. Adjacent to the ridges 24 and 25 stop faces 26 are provided which are engaged by the respective ends of the ridges to stop the members 1 and 4 from being pushed together further when the ridges 24 and 25 interlock. The dove-tailed ridges provide a secure lock and prevent accidental separation of the members 1 and 4.

It will be seen that the present invention provides a cuff link of rugged construction, which may be securely fastened in a cuff to prevent loss or accidental removal thereof. The fastening means is simple and inexpensive and may be readily operated to fasten or unfasten the link with one hand. The fastening means does not in any way impair the appearance of the link or increase materially the cost thereof. In addition, the fastening means does not make it more difficult to insert the link through the holes of the cuff; in fact, the relatively long, narrow ends of the link in the preferred embodiment facilitate insertion through the holes of the cuff. The stud member is preferably integral with one member and securely pivoted to the other member so that the pivoted member moves in a single plane with respect to the stud and the member integral therewith. The cuff link is simple in construction and may be readily manufactured without material changes in existing machinery.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a cuff link or the like, the combination of a member having a stud rigidly secured thereto intermediate the ends of said member and a second member pivotally secured to said stud intermediate the ends of said second member to move in a single plane, the end of one of said members being bent to engage the end of the other of said members, the end of one of said members having a ridge thereon and the end of the other member having a groove therein to permit said ends to snap into locking engagement with each other.

2. In a cuff link or the like, the combination of a member with an upstanding projection rigidly fixed thereto intermediate the ends of said member, a second member hinged to said upstanding projection at a point intermediate the ends of said second member to move in a single plane thereabout, the end of one of said members having a groove therein extending transversely of the plane of movement of said second member, the other of said members having a ridge thereon on the end thereof extending transversely of the plane of the movement of said second member to permit said members to snap into locking engagement with each other.

3. In a cuff link or the like, the combination of a member having a stud rigidly fixed thereto, a second member pivotally secured to said stud, the end of one of said members being bent upwardly substantially parallel to said stud, the end of said other member being adapted to abut against said upwardly bent end, a pivoted bail-like fastening member adapted to extend over the end of the member resting on said bent end to hold it in position thereon, and grooves in the sides of said upwardly bent member into which the sides of the bail are adapted to snap, for resiliently retaining said bail-like member in position over the end of said member.

4. In a cuff link or the like, the combination of a member having a stud adjacent one end thereof rigidly fixed thereto and extending upwardly therefrom, a second member pivotally secured to the other end of said stud, the end of one of said members being bent upwardly to meet the adjacent end of the other of said members, one of said meeting ends having a V-shaped recess and the other a cooperating V-shaped projection adapted to snap together to place the stud under stress and to prevent the parts from moving in any direction except by the force applied for attachment or detachment.

5. In a cuff link or the like, the combination of a substantially flat member having a stud rigidly fixed thereto intermediate the ends thereof, said stud extending upwardly at an acute angle from one side thereof, a second substantially flat member hinged to the other end of said stud to move in a single plane thereabout, the end of one of said flat members being bent upwardly substantially parallel to the stud and backwardly toward the stud to meet the adjacent end of the other of said members, one of said meeting ends having a V-shaped recess and the other a cooperating V-shaped projection adapted to snap together to place the stud under stress and to prevent the parts from moving in any direction except by a force applied for attachment or detachment.

6. In a cuff link or the like, the combination of a member with an upstanding projection rigidly fixed thereto intermediate the ends of said member, a second member hinged to said upstanding projection at a point intermediate the ends of said second member to move in a single plane thereabout, the end of one of said members having a V-shaped recess and a groove in the sides of said recess, said groove extending transversely of the plane of movement of said member, the other of said members having a V-shaped projection at the ends thereof and a ridge on the sides of said projection, said ridge extending transversely of the plane of movement of said member to permit said members to snap into locking engagement with each other and to place said stud under stress to prevent the parts from moving in any direction except by a force applied for detachment or attachment.

GEORGE F. BRECHT.
ERWIN SCHODLBAUER.